July 19, 1966 J. G. MORAN 3,261,513

YIELDABLE CONTAINER WITH DISPENSING CLOSURE

Filed July 3, 1964 2 Sheets-Sheet 1

INVENTOR.
JAMES G. MORAN
BY
ATTORNEYS

July 19, 1966   J. G. MORAN   3,261,513
YIELDABLE CONTAINER WITH DISPENSING CLOSURE
Filed July 3, 1964   2 Sheets-Sheet 2

INVENTOR.
JAMES G. MORAN
BY
ATTORNEYS 3,261,513
YIELDABLE CONTAINER WITH DISPENSING CLOSURE
James G. Moran, 122 N. Rose St., Burbank, Calif.
Filed July 3, 1964, Ser. No. 380,138
8 Claims. (Cl. 222—519)

Second, to provide a yieldable container and dispensing closure which although interconnected by screw threads are so arranged that, once connected, the closure can only be unscrewed a limited distance, the limited movement of the closure being utilized to open and seal an integral discharge nozzle.

Third, to provide a yieldable container and dispensing closure, which, when sealed, is capable of withstanding substantial internal pressures without breaking its seal so that, when sealed, the container may be dropped or stepped on without discharge of its contents.

Fourth, to provide a yieldable container and closure which is particularly suited for dispensing lotions or similar creamy substances and which on being closed, does not cause a residual discharge; but, instead, although repeatedly opened and closed in the course of discharging the contents of the container, remains externally clean and free of any collection of its contents.

With the above and other objects in view, as may appear hereinafter, reference is directed to the accompanying drawings in which.

Figure 1:
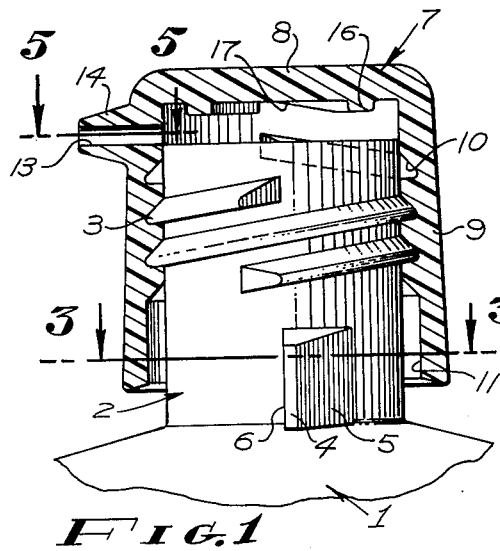
FIGURE 1 is an enlarged fragmentary and partial sectional view showing one form of the yieldable container with the dispensing closure in its open position.

Reference is first directed to FIGS. 1 through 5. In the construction here illustrated, there is provided a container 1 formed of suitable yieldable plastic material so that the container may be squeezed to discharge its contents. The container is provided with a cylindrical neck 2 having at its outer portion external screw threads 3. The screw threads are preferably double pitch. At the base portion of the neck 2 there is provided stop 4 having a beveled or cammed side 5 and a shoulder 6.

The neck 2 receives a closure 7 in the form of a cap having a closed end 8 and a skirt 9. The inner portion of the skirt is provided with internal screw threads 10 which mate with the screw threads 3. The lower or extended portion of the skirt is provided with a counterbore 11. Formed internally in the region of the counterbore is a stop 12 which mates with the stop 4.

Figure 3:
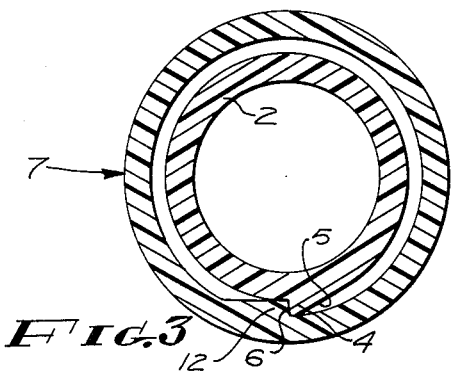
FIGURE 3 is a transverse sectional view taken through 3—3 of FIG. 1 showing the stop means which prevents removal of the dispensing closure.
Figure 5:
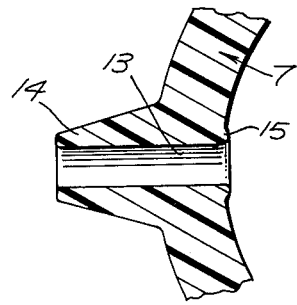
FIGURE 5 is a further enlarged fragmentary sectional view taken through 5—5 of FIG. 1 showing the discharge nozzle and the seal rib at the entrance thereof.
Figure 4:
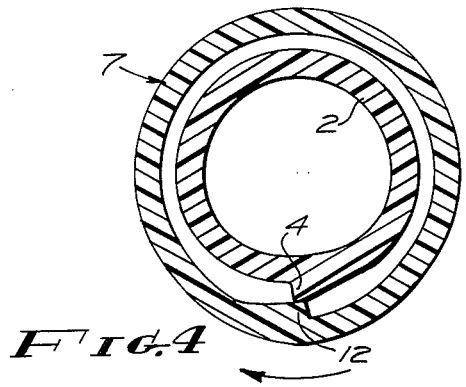
FIGURE 4 is a similar transverse sectional view illustrating the manner in which the stop means on the closure is forced past the stop means on the container.

The closure is likewise formed of plastic material which is yieldable or has elastomeric properties so that the closure may be screwed onto the neck 2 and the stop 12 forced past the stop 4 as indicated in FIG. 4. Once past this position, the closure may be unscrewed only a limited distance, determined by engagement of the stops as shown in FIG. 3.

Figure 2:
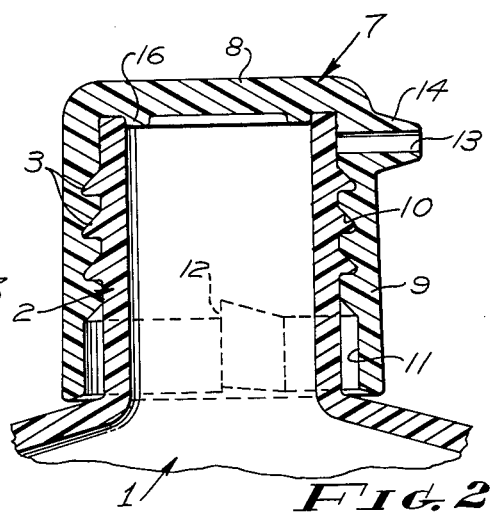
FIGURE 2 is a fragmentary sectional view showing the same region of the container as in FIG. 1 and showing the closure in its sealed position.

At a location near the closed end 8, the skirt 9 is provided with a side port 13 and externally is provided with a nozzle boss 14. At its radially interior end, the side port 13 is surrounded by a rudimentary annular bead 15 which projects into the closure and when the closure is screwed downward on the neck, forms an interfering and sealing fit with the confronting side wall of the neck 2 as shown in FIG. 2.

Formed concentrically in the closed end 8 of the closure is an annular depending lip 16 which fits within the neck 2. The lip is provided with a notch 17.

Operation of the yieldable container and its dispensing closure illustrated in FIGS. 1 through 5 is as follows.

This invention relates to yieldable containers with dispensing closures and included in the objects of this invention are:

First, to provide a yieldable container and dispensing closure involving only two parts, both so constructed as to be readily molded by automatic machines at minimum cost.

Initially, the closure 7 is screw-threaded onto the neck 2 and the stop 12 is forced past the stop 4. When the stops are in engagement as shown in FIG. 3, the side port 13 is disposed above the upper end of the neck 2 so that the contents of the container may be squeezed and forced out the port 13. In order to close the container, the closure is screwed downward onto the neck from the position shown in FIG. 1 to the position shown in FIG. 2. This may involve a half-turn movement of the closure. The container is sealed as soon as the side port 13 has moved below the upper end of the neck 2 and the bead 15 is in interference engagement with the confronting outer surface of the neck 2. In addition, the container is sealed by engagement of the closed end 8 with the extrimity of the neck 2. The notch 17 permits any residual contents trapped externally of the lip 16 to return to the container. Once the closure is tightened as shown in FIG. 2, the contents are thoroughly sealed and are not discharged even though the container should be subjected to substantial external compression forces.

Various plastic materials such as polyethylene, polyurethane, polystyrene, or synthetic or natural rubber may be employed to form the container or the closure.

Figure 6:
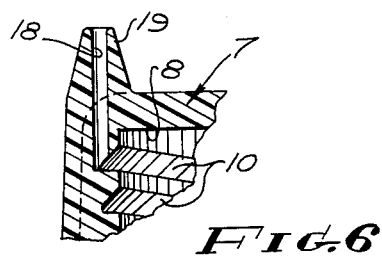
FIGURE 6 is a fragmentary sectional view showing a modified dispensing closure in which the nozzle extends axially.

Reference is directed to FIG. 6. The modification here illustrated consists essentially in substituting an axial port 18 for the radial or side port 13 and to provide an axially extending nozzle boss 19. In this case the axial port communicates with the extremity of one of the internal screw threads 10 and the container is sealed solely by engagement of the closed end 8 with the extremity of the neck 2.

Reference is now directed to FIGS. 7 through 12. The modified structure here illustrated includes a container 21 having a neck 22. The neck is provided with an enlarged base portion 23 having a stop 24 corresponding to the stop 4. Above the base portion 23, the neck 22 is provided with screw threads 25 which in this case may be single pitch. Above the screw threads there is provided a cylindrical portion 26 in which is formed a side aperture 27. Externally, the side aperture 27 is provided with a rudimentary annular bead 28, as shown best in FIG. 12.

The neck 22 receives a closure 29 having a closed end 30 and a skirt 31. The skirt 31 is provided with internal screw threads 32 which mate with the screw threads 25. At its lower extremity, the skirt 31 is provided with a counterbore 33, the walls of which confront the enlarged portion 23 and are provided with a stop 34 corresponding to the stop 12.

The skirt 31 is provided with a side port 35 located above the screw threads 32 and externally is provided with a nozzle boss 36 into which the side port extends. The closed end 30 is provided with a depending rib 37 which extends into the neck 22.

Operation of the construction shown in FIGS. 7 through 12 is as follows.

Figure 7:
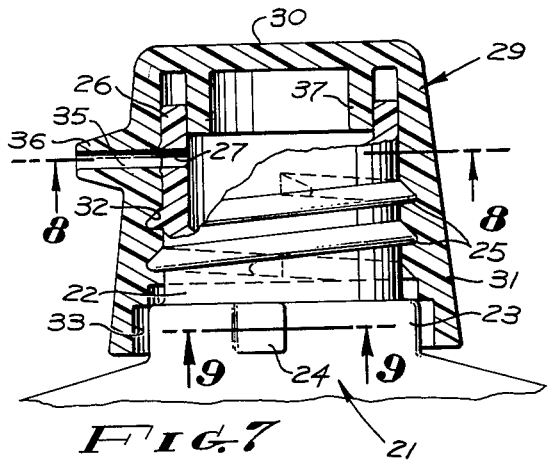
FIGURE 7 is a fragmentary partial sectional view similar to FIG. 1 showing a further modified form of the yieldable container and dispensing closure, the parts being shown in their open position.
Figure 12:
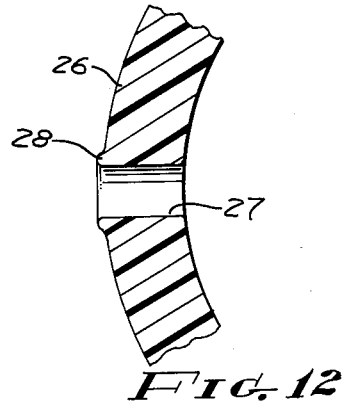
FIGURE 12 is a further enlarged sectional view taken within circle 12 of FIG. 10 showing the neck portion only of the container and illustrating the port therethrough and its sealing means which cooperates with the dispensing nozzle.
Figure 8:
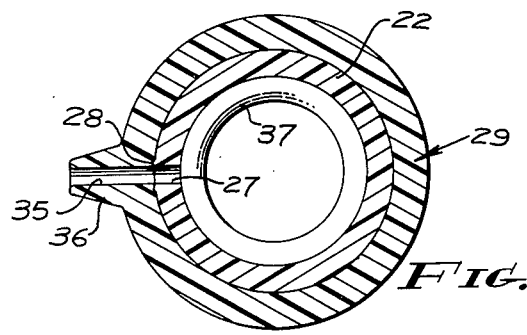
FIGURE 8 is a transverse sectional view through 8—8 of FIG. 7.
Figure 9:
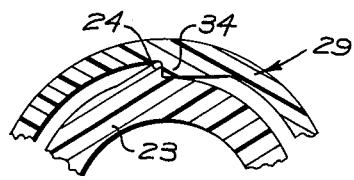
FIGURE 9 is a fragmentary sectional view taken through 9—9 of FIG. 7 showing the stops in their engaged position which disposes the spout in its open position shown in FIG. 8.

The closure is initially screw-threaded onto the neck 2 until the stop 24 is forced past the stop 34. When the closure is backed off so that the stops are in interengagement as shown in FIG. 9, the side port 35 is disposed in alignment with the side aperture 27 as shown in FIGS. 7 and 8. When the side aperture 27 is in alignment with the side port 35, the annular bead 28 presses into the surface of the skirt 31 forming an interference fit which seals the passageway to prevent flow of fluid between the confronting walls of the neck 22 and the skirt 31.

Figure 10:
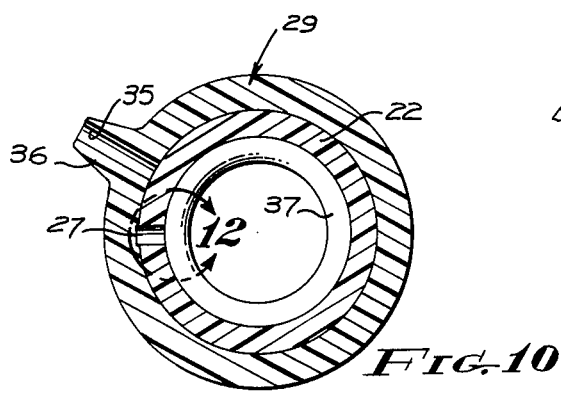
FIGURE 10 is a sectional view corresponding to FIG. 8 but showing the spout in its closed position.
Figure 11:
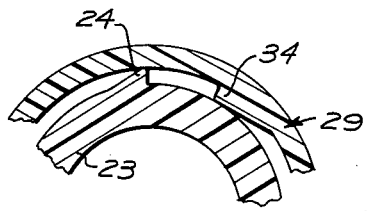
FIGURE 11 is a corresponding fragmentary sectional view showing the relationship of the stops when the spout is closed.

In order to seal the container, it is merely necessary to turn the closure a short distance as indicated in FIG. 10. When this is done, the annular bead 28 forms a tight fit against the confronting wall of the skirt 31 as shown in FIG. 10.

The depending annular rib 37 remains at all times within the neck 22 and forms a seal therewith. Should the contents of the container be placed under excessive pressure due to excessive squeezing of the container, such pressure acts on the interior of the annular rib 37 to force the rib into tighter contact with the neck 22 and maintain its seal.

An air space may be maintained between the extremity of the neck 22 and the closed end 30 or the space may be eliminated and the closure may be screwed into tight axial engagement with the neck in the manner of the closure 7 as shown in FIG. 2.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A container and dispensing closure, comprising:
    (a) a container member including an externally screwthreaded neck portion having a radially directed side duct;
    (b) a closure member including a closed end, an internally screwthreaded skirt for screwthreaded connection with said neck, and a discharge duct having a radially outwardly directed entrance end in said skirt movable into and out of registry with said side duct on relative rotation of said container member and closure member;
    (c) at least one of said members being formed of yieldable material;
    (d) one of said members having a raised rim of uniform height and width surrounding the end of its duct confronting the other of said members to cause said yieldable member to yield and maintain a pressure and sealing contact with the other of said members in the region of said raised rim.

2. A container and dispensing closure therefor according to claim 1, wherein:
    (a) said raised rim borders the entrance end of the discharge duct in said closure member.

3. A container and dispensing closure therefor according to claim 1, wherein:
    (a) said raised rim borders the exit end of said side duct in said container member.

4. A container and dispensing closure therefor according to claim 1, wherein:
    (a) the closed end of said closure member sealingly engages the extremity of said neck when said ducts are out of registry.

5. A container and dispensing closure therefor, comprising:
    (a) container including an externally screwthreaded neck portion having a stop lug at the base thereof;
    (b) a yieldable closure having a closed end, an internally screwthreaded skirt, and a stop within the extremity of said skirt;
    (c) said container and closure being connected by said screwthreads, and the stop on said closure adapted to be forced past the container stop whereby said stops are engageable to limit unscrewing movement of said cap;
    (d) interengageable seal means at the extremity of said neck portion and the closed end of said closure operable when said closure is screwed on said neck;
    (e) a side port extending through said closure, and movable with said closure between a closed position confronting the side of said neck portion when said seal means are interengaged, and an open position when said stops are interengaged;
    (f) said side port being positioned to clear the top of said neck portion when said side port is in its open position;
    (g) and a raised bead bordering the end of said side port confronting said neck for pressure contact with said neck portion to form therewith a seal independent of said seal means.

6. A container and dispensing closure therefor, comprising:
    (a) a yieldable container having a neck portion;
    (b) a yieldable closure having a closed end and a skirt;
    (c) means interconnecting said neck portion and closure for limited rotational movement between a first position and a second position;
    (d) seal means incorporating said neck and closure and operable to seal said container when said neck portion and closure are in their second position;
    (e) a port extending from the inner surface of said skirt through said closure, and movable between a sealed position confronting said neck portion when said interconnecting means is in its first position and an open position when said interconnecting means is in its second position;
    (f) said side port being positioned to clear the top of said neck portion when said side port is in its open position;
    (g) and a raised bead bordering the end of said side port confronting said neck for pressure contact with said neck portion to form therewith a seal independent of said seal means.

7. A container and dispensing closure therefor, comprising:
    (a) container including an externally screwthreaded neck portion having a stop lug at the base thereof;
    (b) a yieldable closure having a closed end, an internally screwthreaded skirt, and a stop within the extremity of said skirt;

(c) said container and closure being connected by said screwthreads, and the stop on said closure adapted to be forced past the container stop whereby said stops are engageable to limit unscrewing movement of said cap;

(d) interengageable seal means at the extremity of said neck portion and the closed end of said closure operable when said closure is screwed on said neck;

(e) a side port extending through said closure, and movable with said closure between a closed position confronting the side of said neck portion when said seal means are interengaged, and an open position when said stops are interengaged;

(f) a second side port in said neck portion, said ports being movable into and out registry;

(g) and a raised bead bordering one of said side ports for pressure contact to form a seal independently of said seal means.

8. A container and dispensing closure therefor, comprising:

(a) a yieldable container having a neck portion;

(b) a yieldable closure having a closed end and a skirt;

(c) means interconnecting said neck portion and closure for limited rotational movement between a first position and a second position;

(d) seal means incorporating said neck and closure and operable to seal said container when said neck portion and closure are in their second position;

(e) a port extending from the inner surface of said skirt through said closure, and movable between a sealed position confronting said neck portion when said interconnecting means is in its first position and an open position when said interconnecting means is in its second position;

(f) a second side port in said neck portion, said ports being movable into and out of registry;

(g) and a raised bead bordering one of said side ports for pressure contact to form a seal independently of said seal means.

References Cited by the Examiner

UNITED STATES PATENTS

| | | | |
|---|---|---|---|
| 2,828,895 | 4/1958 | Mart | 222—536 |
| 2,849,166 | 8/1958 | Eitzel | 222—519 |
| 2,877,918 | 3/1959 | Gardner | 222—522 |
| 2,966,286 | 12/1960 | Morgan | 222—536 |
| 3,067,916 | 12/1962 | Lerner | 222—519 |
| 3,126,125 | 3/1964 | Eggers | 221—96 |
| 3,168,969 | 2/1965 | Krieps | 222—568 X |

LOUIS J. DEMBO, *Primary Examiner.*

WALTER SOBIN, *Examiner.*